(No Model.) 2 Sheets—Sheet 1.

F. R. SALE.
COFFEE CABINET.

No. 580,832. Patented Apr. 13, 1897.

Witnesses.
W. E. Allen.
Edw. K. Allen.

Inventor.
Frank R. Sale.
By Walter Allen Atty.

(No Model.) 2 Sheets—Sheet 2.
F. R. SALE.
COFFEE CABINET.
No. 580,832. Patented Apr. 13, 1897.
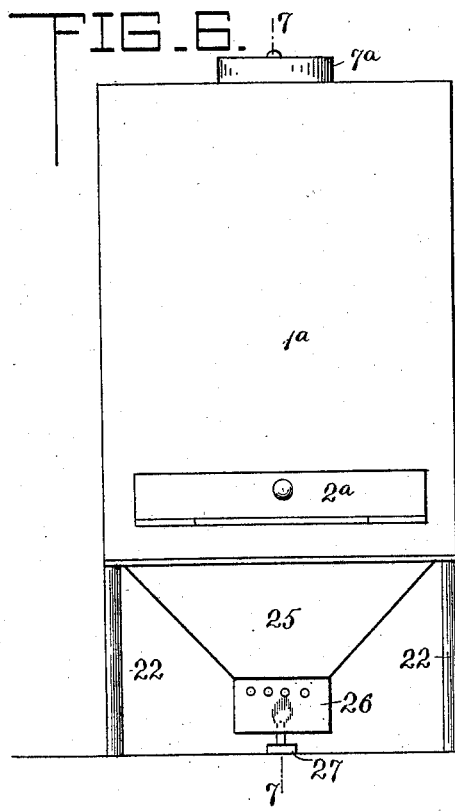
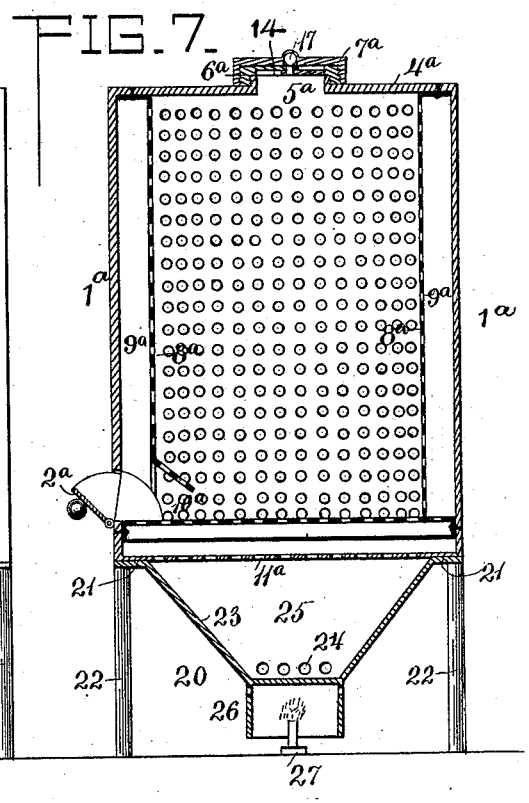
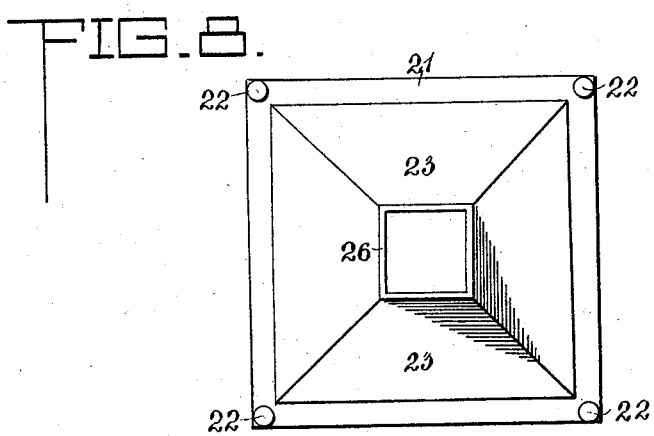
Witnesses.
W. E. Allen.
E. K. Allen.
Inventor.
Frank R. Sale.
By Walter Allen
Atty.

UNITED STATES PATENT OFFICE.

FRANK R. SALE, OF CHICAGO, ILLINOIS.

COFFEE-CABINET.

SPECIFICATION forming part of Letters Patent No. 580,832, dated April 13, 1897.

Application filed December 19, 1896. Serial No. 616,249. (No model.)

*To all whom it may concern:*

Be it known that I, FRANK R. SALE, a citizen of the United States, and a resident of Chicago, in the county of Cook and State of Illinois, have invented certain new and useful Improvements in Coffee-Cabinets for Store Furniture, of which the following is a specification.

My invention relates to an improved coffee-cabinet for store furniture.

It is well known that the roasted coffee-berry is very porous and absorbs dampness or moisture very readily, as well as the deleterious gases and odors in the surrounding atmosphere, all of which impair the natural flavor and aroma of the roasted coffee-berry and render it unfit for use in a short time.

The object of my invention is to provide means whereby the roasted coffee-berries when stored in a coffee-cabinet can retain their freshness and crispness and at the same time be kept in a warm dry condition, so that when the coffee is furnished to the customer it may be in as good condition for use or consumption as when it was discharged from the roasting-machine.

My improvement consists in combining with a coffee-cabinet an inner perforated receptacle for the body or mass of coffee, leaving a space surrounding the receptacle and beneath the same, through which currents of fresh, dry, and warm air can be passed under, around, and through the mass or body of material, and forming in the base of the cabinet suitable air-inlets beneath the receptacle for the entrance of the air-currents and at the top of the cabinet a suitable exit for air, which may be in the form of a register, which may be arranged to control the amount and speed of the air passing through the cabinet, all as hereinafter described and claimed.

In order that my invention may be fully understood, I will proceed to describe it with reference to the accompanying drawings, in which—

Figure 1:
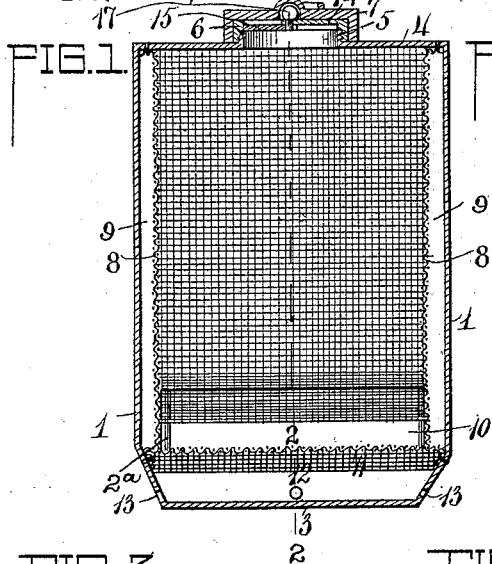
Figure 2:
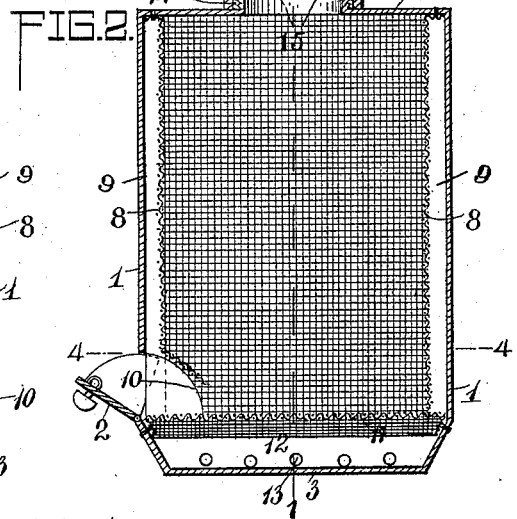
Figure 3:
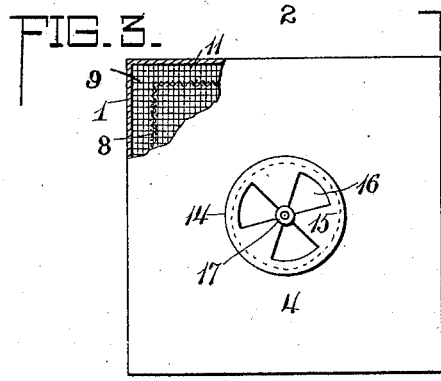
Figure 4:
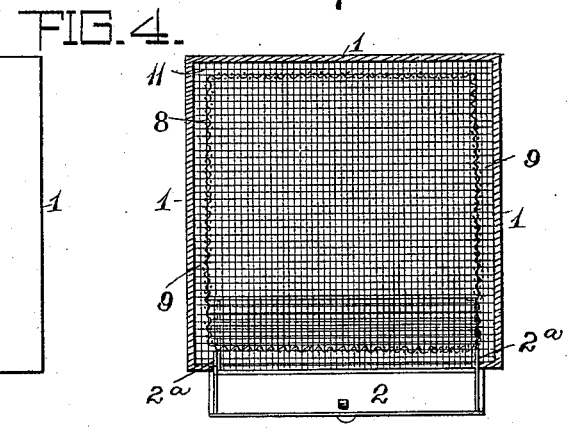
Figure 5:
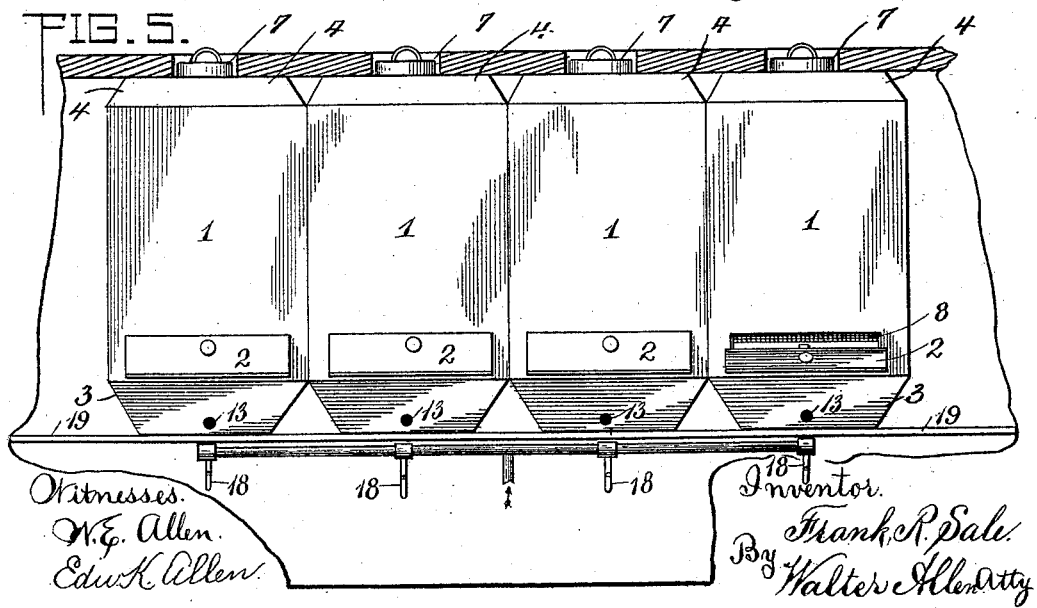

Figure 1 is a vertical section of my improved coffee-cabinet for store furniture on the line 1 1, Fig. 2, looking toward the front of the cabinet. Fig. 2 is a vertical section of the same on the line 2 2, Fig. 1, looking toward the left-hand side of the cabinet, the drop-door being open. Fig. 3 is a top plan view thereof, the cap being omitted and one corner of the top being broken away to show the perforated or open-mesh receptacle. Fig. 4 is a horizontal section of the cabinet on the line 4 4, Fig. 2. Fig. 5 is a front elevation of a set or series of such cabinets for different kinds and grades of coffee, arranged on a heated table. Fig. 6 is a front elevation of a coffee-cabinet of modified construction in which the heating device is placed within the base or stand thereof. Fig. 7 is a vertical section of the same on the line 7 7, Fig. 6. Fig. 8 is a bottom view thereof.

Referring to Figs. 1 to 5, both inclusive, my improved cabinet is constructed with a body having a casing or outer shell 1, provided with a drop-door 2, having flanged sides and closing an outer scoop-opening, a base 3 and a top 4, formed with a filling, and air-outlet opening 5, having a collar 6 and closed by a removable cap or cover 7. Within the body is located a perforated coffee-receptacle or inner shell 8, of wire mesh, arranged so as to leave space 9 for the circulation of air between the outer and inner shells. This receptacle has a scoop-opening 10, through which the contents are removed by an ordinary scoop. The outer scoop-opening is closed by the drop-door of the casing, whose flanges are fastened to the inner shell. Beneath the opening to the receptacle is a perforated false bottom 11, also of wire mesh, separating the receptacle from the base, so as to provide a warm-air space or chamber 12 beneath. Fresh air is admitted to the receptacle through one or more holes 13 in the wall of the base. Beneath the cap or cover is located a register 14 for regulating or controlling the amount of air passing through the body of material. It consists of a pair of disks 15, pivoted together and having registering segmental openings 16, one of the disks being rotated by means of a knob 17, so as to regulate the size of the air-passages therethrough. This cabinet can be placed over any suitable form of low-heating device or burner 18, so as to warm the base and thus cause currents of air to pass into the air-chamber and upwardly around and through the mass or body of material contained in the receptacle. A series or set of these cabinets are shown in Fig. 5 located on a table 19, heated by suitable burners beneath the table.

Referring to Figs. 6 to 8, inclusive, wherein I show a modified construction of cabinet and a stand therefor, $1^a$ is the casing or outer shell, provided with a drop-door $2^a$, having flanged sides, and a top $4^a$, formed with a filling-opening $5^a$, having a collar $6^a$, closed by a cap or cover $7^a$. Within the body is located a coffee-receptacle or inner shell $8^a$ of perforated sheet metal and arranged so as to leave a space $9^a$ for the circulation of air between the outer and inner shells. This receptacle has also an opening $10^a$, through which the contents are removed by an ordinary scoop. The opening is closed by the drop-door $2^a$ of the casing, which is fastened to the inner shell. $11^a$ is the perforated bottom plate to the receptacle, by which the latter is supported on the horizontal flanges 21 of a stand 20, on which the cabinet is placed. The stand is also provided with legs 22. Within the stand and depending from the horizontal flange beneath the receptacle is a conical or downwardly-tapering shell 23, formed with air-inlets 24, near the bottom thereof, and providing a warm-air chamber 25. To the lower end of this shell is secured a pendent burner-hood 26, in which is located a suitable burner 27 for the purpose of heating the air in the chamber above without any possibility of the products gaining access thereto, as they are permitted to pass out at the opposite ends of the hood at right angles to the perforations in the shell of the air-chamber.

This improvement in coffee-cabinets will enable the dealer to keep the coffee warm and as crisp as when first roasted.

The currents of warm air passing through the mass of material will drive out the impurities absorbed while in transit and on the premises of the dealer.

The cabinet can be manufactured as a single article, in pairs, or in sets of three or more. These cabinets can be manufactured of such dimensions or form as to enable them to be placed under the counter of the dealer. They can be placed in bins or on shelving, as is now common with the ordinary cabinet or canister used by dealers for storing their teas and spices.

Having thus described my invention, the following is what I claim as new therein and desire to secure by Letters Patent:

A coffee-cabinet for store furniture comprising a casing constructed with a base having an air-inlet opening, with a body having an outer scoop-opening adjacent to the base, and with a top having a combined filling and air-outlet opening, a door for closing the outer scoop-opening, the perforated receptacle, in which the body, or mass, of roasted coffee is stored, having an inner scoop-opening and a bottom adjacent to the base, means for supporting the receptacle within the body of the casing in such a position as to leave an air-space between the walls of the body and the walls of the receptacle and an air-chamber, beneath the receptacle, in the base of the casing, and means for controlling the passage of air through the air-outlet opening; the whole adapted to be placed over a low-heating device so as to cause currents of air to enter the air-chamber in the base and to be dried, and warmed, therein, and to circulate beneath, and around, the body, or mass, of roasted coffee-berries contained in the receptacle, and to gradually, or slowly, pass into the body, or mass, and to meander therethrough until they pass out of the receptacle through the air-outlet opening thereabove for the purpose of keeping the roasted coffee-berries fresh, warm, and dry, and in proper condition for use, by preventing the coffee-berries from absorbing moisture, deleterious gases, or odors, from the surrounding atmosphere, to which they are exposed, and to which they are rendered sensitive, when roasted and prepared for use; substantially as described.

FRANK R. SALE.

Witnesses:
WALTER ALLEN,
JOHN IMIRIE, Jr.